Patented Feb. 14, 1939

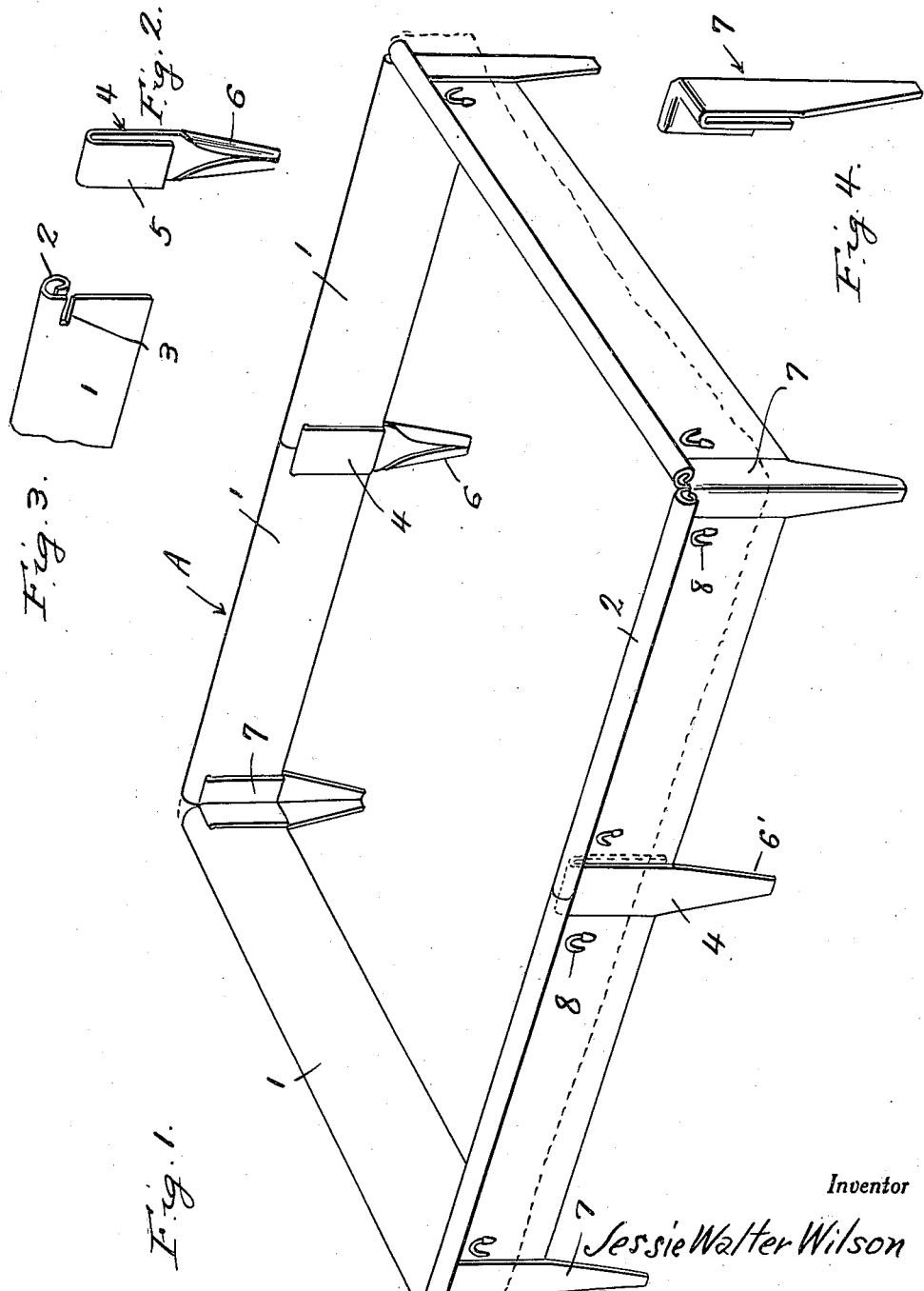

2,146,784

UNITED STATES PATENT OFFICE 2,146,784

INSECTPROOF SEEDBED BORDER AND CANVAS SUPPORT

Jessie Walter Wilson, Springfield, Tenn., assignor of one-third to T. O. McMahan and one-third to A. L. Dorsey, both of Springfield, Tenn.

Application April 22, 1938, Serial No. 203,653

1 Claim. (Cl. 47—33)

This invention relates to an insect-proof seed bed border and canvas support, the general object of the invention being to provide a metal border so constructed and arranged that when placed around a seed bed insects cannot pass through the same to reach the plants in the bed, with means for attaching a canvas cover to the device when it is desired to cover the bed with canvas or the like.

A further object of the invention is to provide means whereby the border device can be made of different sizes by adding sections thereto or removing some of the sections.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a perspective view of the device.

Figure 2 is a view of one of the intermediate leg members.

Figure 3 is a perspective view of one end of one of the border sections.

Figure 4 is a view of a corner leg member.

In the drawing the border forming device A is composed of suitable metal and includes a plurality of sections 1 each of which is formed with a roll 2 at its upper edge and on the exterior face thereof and each section at each end thereof has a slot 3 therein adjacent the roll. These sections are of elongated straight form and when two sections are to be connected together in aligned position a leg member shown at 4 is provided. Each leg member is also formed of metal and its upper part is of inverted U-shape as shown at 5 with one leg longer than the other to provide the tapered part 6 and this part can be formed by folding over edge portions of the long limbs, as shown in Figure 2 or if desired this tapered part may be formed by simply cutting the side edges on a taper as shown at 6' in Figure 1. The bight of each leg member is inserted in the adjacent slots 3 of the two aligned sections 1 with one limb of the U-shaped part contacting the exterior faces of said end part and the other limb contacting the interior faces thereof as shown in Figure 1. Thus the two sections are held together. The corner leg members are shown at 7 and each corner leg member is of angle shape in cross section so as to receive two ends of the two sections with one section placed at right angles to the other. It will, of course, be understood that the tapered portions of all the leg members extend below the lower edge of the sections 1 and these leg members are to be pressed into the soil around the seed bed and the lower edges of the sections may be pressed into the bed to prevent insects from crawling underneath the sections. Also the leg members must have a close fit in the slots 3 to prevent insects from entering the said slots. The short limb of each leg member extends to the lower edges of the sections as shown so that the adjacent ends of two sections are firmly held by the U-shaped parts of the leg member and there is no danger of insects passing between the ends of the sections even though a space was inadvertently left between said ends of the sections. The corner leg members may be formed with beveled edges as shown at the left of Figure 1 or these corner members can also be formed by turning over the edges the same as shown at 6 in Figure 2.

Hooks 8 are fastened in any suitable manner to the exterior faces of the sections 1 so that a canvas cover can be stretched over the device and fastened to these hooks, when it is desired to cover the seed bed.

As before stated the device can be made of various sizes by simply connecting the sections together in any desired number by the leg members.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention, what is claimed as new is:—

A seed bed border comprising a plurality of metal sections of elongated form and having longitudinally extending slots at the ends thereof, and leg members each having its upper portion of inverted U-shape with the bight part adapted to extend into the slots of a pair of sections to connect the sections together, each leg member having a ground penetrating lower part and some of the leg members being of angle shape in cross section for engaging two sections which are arranged at right angles to each other, the ground penetrating lower part of each leg member forming a continuation of one limb of the U and the other limb extending to a point flush with the lower edges of the sections.

JESSIE WALTER WILSON.